(12) United States Patent
Studer et al.

(10) Patent No.: US 10,798,933 B2
(45) Date of Patent: Oct. 13, 2020

(54) INSECT LIGHT TRAP WITH EXTRUDED CURVED SIDE PANELS AND CURVED GLUE BOARD

(71) Applicant: GARDNER MANUFACTURING CO., INC., Horicon, WI (US)

(72) Inventors: Bruce R. Studer, Germantown, WI (US); Timothy M. Jones, Phoenix, AZ (US)

(73) Assignee: Gardner Manufacturing Co., Inc., Horicon, WI (US)

( * ) Notice: Subject to any disclaimer, the term of this patent is extended or adjusted under 35 U.S.C. 154(b) by 561 days.

(21) Appl. No.: 15/395,873

(22) Filed: Dec. 30, 2016

(65) Prior Publication Data
US 2018/0184635 A1 Jul. 5, 2018

(51) Int. Cl.
*A01M 1/04* (2006.01)
*A01M 1/14* (2006.01)

(52) U.S. Cl.
CPC .............. *A01M 1/145* (2013.01); *A01M 1/04* (2013.01); *A01M 1/14* (2013.01)

(58) Field of Classification Search
CPC .......... A01M 1/04; A01M 1/14; A01M 1/145
USPC .................................................. 43/113, 114
See application file for complete search history.

(56) References Cited

U.S. PATENT DOCUMENTS

| | | | | |
|---|---|---|---|---|
| 550,345 | A * | 11/1895 | Humphreys | 43/113 |
| 3,023,539 | A * | 3/1962 | Emerson, Jr. | A01M 1/145 43/113 |
| 4,117,624 | A * | 10/1978 | Phillips | A01M 1/145 43/113 |
| 4,127,961 | A * | 12/1978 | Phillips | A01M 1/08 43/113 |
| 4,947,578 | A * | 8/1990 | Anderson | A01M 1/02 43/131 |
| 5,550,451 | A | 8/1996 | Itoh et al. | |
| 5,634,292 | A | 6/1997 | Kitterman | |
| 6,393,759 | B1 * | 5/2002 | Brown | A01M 1/023 43/113 |
| 6,397,515 | B1 * | 6/2002 | Brown | A01M 1/145 43/113 |
| 6,560,919 | B2 * | 5/2003 | Burrows | A01M 1/145 43/107 |
| 6,886,292 | B2 * | 5/2005 | Studer | A01M 1/026 43/112 |

(Continued)

FOREIGN PATENT DOCUMENTS

| | | | | |
|---|---|---|---|---|
| DE | 10236531 A1 * | 2/2004 | | A01M 1/145 |
| JP | 01055137 A * | 3/1989 | | |

(Continued)

*Primary Examiner* — Darren W Ark
(74) *Attorney, Agent, or Firm* — Thomas J. Nikolai; DeWitt LLP

(57) ABSTRACT

Insect capture is improved by providing a glue board having an adhesive coating on its front surface and forming a pattern of insect attractant UV light on that front surface. That pattern includes areas of bright UV light generated by light-emitting diodes that generate light at different wavelengths behind and visible through the glue board by flying insects, dimmer areas of light generated by said light-emitting diodes that bounce off other portions of the device onto the glue board, and areas of shadow on the glue board where no or little light from said light-emitting diodes is present.

13 Claims, 17 Drawing Sheets

(56) References Cited

U.S. PATENT DOCUMENTS

| | | | |
|---|---|---|---|
| 6,965,205 B2 | 11/2005 | Piepgras et al. | |
| 7,191,560 B2* | 3/2007 | Harris | A01M 1/02 43/107 |
| 7,784,215 B2 | 8/2010 | Cohnstaedt et al. | |
| 7,937,887 B2* | 5/2011 | Child | A01M 1/023 43/113 |
| 8,327,577 B2* | 12/2012 | Liang | A01M 1/106 43/113 |
| 10,327,435 B2* | 6/2019 | Studer | A01M 1/106 |
| 2002/0078620 A1* | 6/2002 | Nelson | A01M 1/04 43/113 |
| 2003/0079398 A1* | 5/2003 | Holmes | A01M 1/145 43/113 |
| 2006/0218851 A1* | 10/2006 | Weiss | A01M 1/023 43/113 |
| 2007/0011940 A1* | 1/2007 | Chen | A01M 1/02 43/113 |
| 2007/0124987 A1 | 6/2007 | Brown et al. | |
| 2008/0229652 A1* | 9/2008 | Willcox | A01M 1/145 43/113 |
| 2009/0038207 A1* | 2/2009 | Lin | A01M 1/04 43/112 |
| 2010/0071257 A1* | 3/2010 | Tsai | A01M 1/226 43/113 |
| 2010/0263260 A1* | 10/2010 | Engelbrecht | A01M 1/02 43/113 |
| 2011/0283597 A1* | 11/2011 | Coventry | A01M 1/023 43/107 |
| 2013/0097918 A1* | 4/2013 | Coventry | A01M 1/145 43/113 |
| 2016/0000060 A1 | 1/2016 | Sandford et al. | |
| 2016/0262367 A1 | 9/2016 | Sandford et al. | |
| 2018/0213763 A1* | 8/2018 | Lee | A01M 1/04 |
| 2018/0263234 A1* | 9/2018 | Sasaki | H02S 40/32 |
| 2018/0271080 A1* | 9/2018 | Kim | A01M 1/04 |
| 2018/0317473 A1* | 11/2018 | Gries | A01M 1/04 |
| 2019/0133105 A1* | 5/2019 | Leach | A01M 1/106 |
| 2019/0133106 A1* | 5/2019 | Eom | A01M 1/06 |
| 2019/0281805 A1* | 9/2019 | Jaffrey | A01M 29/12 |
| 2019/0307113 A1* | 10/2019 | Horne | A01M 1/04 |
| 2019/0313620 A1* | 10/2019 | Nyberg | A01M 1/12 |

FOREIGN PATENT DOCUMENTS

| | | | | |
|---|---|---|---|---|
| JP | 08000146 A | * | 1/1996 | |
| JP | 08033444 A | * | 2/1996 | |
| JP | 2599101 B2 | * | 4/1997 | |
| JP | 3320727 B2 | * | 9/2002 | A01M 1/02 |
| JP | 2004105058 A | * | 4/2004 | |
| JP | 2012239443 A | * | 12/2012 | |
| JP | 2018143126 A | * | 9/2018 | |
| KR | 20080087486 A | * | 10/2008 | |
| KR | 20100033336 A | * | 3/2010 | |
| WO | WO9220224 | | 11/1992 | |
| WO | WO-2006056729 A1 | * | 6/2006 | A01M 1/04 |
| WO | WO-2017137749 A1 | * | 8/2017 | A01M 1/145 |

* cited by examiner

INSECT LIGHT TRAP WITH EXTRUDED CURVED SIDE PANELS AND CURVED GLUE BOARD

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates generally to insect traps. More specifically, the present invention relates to improvements to insect traps employing a light source as an insect attractant and at least one glue board as an insect capture device.

II. Discussion of Related Art

Those skilled in the art know that light provides an effective insect attractant and that light in the ultraviolet. ("UV") range of the light spectrum is particularly attractive to many flying insects. UV light is light having a wavelength generally in the range of 100 to 400 nanometers.

Based on this phenomenon, designers of insect light traps have often employed fluorescent tubes incorporating phosphor that predominantly emits UV light instead of white light visible to humans. One advantage of such fluorescent UV tubes is that they can be "tuned" to give off peak light in very narrow UV ranges based upon the phosphor selected. For example, europium-doped strontium fluoroborate phosphor will produce a peak emission of light in the 368 to 371 nm range while lead-doped barium silicate phosphor will produce a peak emission of light in the 350 to 353 nm range. However, energy consumption by such light sources and disposal of such light sources create environmental issues. Health concerns can also arise if the fluorescent tube breaks and its contents are inhaled or ingested. Thus, with the increased affordability of light-emitting diodes (LEDs) and the availability of LEDs that generate UV light attractive to insects, the use of LEDs is now a viable alternative to fluorescent tubes.

Those skilled in the art also know that an insect trap must not only lure the insects to the trap, but must also either capture or kill the insects that are lured to the trap. Four basic methods are used. First, electrical grids that electrocute the insects meeting the grid have been used. These, however, are entirely unsuitable for restaurants and other areas where food is prepared or served due to splatter of bug parts. Second, various poisons have been employed, but the use of a poison is unacceptable where young children are present who might ingest the poison. Third, various mechanisms have been employed to move the insects into chambers from which the insect cannot escape. For flying insects, this technique typically involves the use of fans that create an airflow or current, drawing the insects into a chamber and then preventing the insects from escaping. Fourth, adhesive surfaces such as those of glue boards have been used. Glue boards are generally safe, but a glue board coated with flying insects is generally unsightly and unpleasant to look at. Also, if the light source is any distance from the glue board, insects attracted to the light source may never meet the glue board and, thus, may fly away without being captured.

In view of the foregoing, there is a real need for improvements in flying insect trap design, both in terms of insect attraction and capture.

Still other needs exist. Prior art traps have often been made from materials that are expensive or are of a design that requires expensive and time-consuming assembly steps. Further, traps have typically been designed to be mounted to a vertical wall. Prior art traps are typically not suitable for use, and not adapted to be mounted, under horizontal surfaces such as the bottom of a cabinet, shelf or bar. If the opening through which light escapes from the trap is pointed downwardly, the glue board tends to slide out of the trap. If the opening faces rearwardly, the opening is typically too close to an adjacent wall making it inconvenient or impossible to change the glue board without removing the trap from the horizontal surface. If the opening points out into the room, the harsh light will annoy people in the room.

SUMMARY OF THE INVENTION

The present invention relates to insect traps including a housing adapted to be mounted to the bottom of a horizontal surface such as a bar, shelf or cabinet. The housing has a front, back (which may be removable), first side, second side, a first flange projecting outwardly and substantially normal to the first side, and a second flange projecting outwardly and substantially normal to the second side. The first and second flanges may be integrally formed with the back of the housing.

The insect trap also includes at least one socket. The socket(s) typically will project from the front of the housing. The socket is adapted to hold, orient and electrify a light source. The light source may be a fluorescent tube in which case the housing may hold a ballast and a starter. Alternatively, the light source may comprise an electronic circuit including a plurality of spaced apart light-emitting diodes adapted to emit light in differing portions of the light spectrum. The LED light sources may be arranged in an elongate fashion and housed in a tube made of UV light-transmissive material.

On one embodiment, the trap also includes a shade comprising two extruded side panels integrally formed with a web joining the two side panels together. The web is adapted to reside between the back of the housing and the remainder of the housing. The shade may also include a pair of end caps adapted to be mounted to (or integrally formed with) the opposite ends of the side panels. The end caps may each have an inwardly projecting curved U-shaped ledge (or a pair of curved ledges) spaced from the side panels such that the space between each ledge of the end caps and each of the side panels serves as a glue board receiving channel. As such, the shade is adapted to receive two glue boards, one adjacent each of the two side panels. One edge of the glue board is received in a channel adjacent to one of the end caps (the first glue board receiving channel) and the opposing edge of the glue board is adapted to be received in a channel adjacent to the other end cap (the second glue board receiving channel). The curvature of the ledges and the side panel forming the first and second glue board receiving channels in which the opposing edges of the glue board are received serves to advantageously curve the glue board so that it has a concave curvature corresponding to the concave curvature of the adjacent side panel.

Alternatively, each panel of the shade may be separate from the other and comprise a housing clamp including a first channel, a gusset and a first lip. The first channel is adapted to frictionally engage one of the flanges of the housing while the first lip engages the front of the housing to clamp the integrally formed side panel to the housing. The side panel(s) also include a curved main wall extending from the housing clamp and terminating in a second lip. A first glue board receiving channel is formed by (and near) the intersection of the gusset and curved main wall and a second glue board receiving channel is formed by the second lip and the curved main wall. Again, when two such panels are employed, the shade may include a pair of end caps adapted to be mounted to the opposite ends of the side panels. At least one end cap is removable to enable insertion and removal of the glue boards.

The glue board includes a substrate having front and back sides and an adhesive layer coating a selected portion of the front side. The glue board has a first edge adapted to be received in the first glue board receiving channel and a second edge adapted to be received in the second glue board receiving channel. These may be the longitudinal edges or the transverse edges of the glue board depending on the configuration of the shade of the trap. As such, the selected portion of the front side coated with adhesive will be spaced from each of the edges of the glue board. The glue board is flexible enough so that when the edges are in the glue board receiving channels the glue board is curved and the curvature of the glue board matches that of the curved main wall. Forces between the edges of the glue board and the structure defining the glue board receiving channels and frictional engagement of the back side of the glue board with the curved main wall serve to hold the glue board in place and prevent it from accidentally dislodging from the integrally formed side panel.

The curved main wall of a side panel may be provided with openings that allow the egress of light through the curved main wall and the ingress of insects through the curved main wall. Likewise, the glue board may include openings that are aligned with the openings of the curved main wall when the edges of the glue board are within the first and second glue board receiving channels. As such, the glue board is adapted to permit UV light to pass through the glue board.

The housing is adapted to hold an electrical circuit. If the light source is a fluorescent tube, the circuit will include a ballast and a starter. If the light source is an LED or a group of LEDs the LEDs may be arranged in a pattern. The LEDs may also be adapted to emit light in both the ultraviolet and visible light ranges. The electrical circuit coupled to the LEDs may be designed to cause the LEDs to selectively dim and brighten or cycle on and off to increase insect attraction.

More specifically, the LEDs may be selected and arranged to cast light in a pattern attractive to flying insects generally or to specific species of insects. The LEDs may be selected or adapted to cast light at different wavelengths. For example, a first group of LEDs used may cast light in the 5000K range approximately soft daylight. Another group of LEDs used may cast light at a wavelength of about 560 nm such that the light has a yellowish green color. Still another group of LEDs used may cast light that has a wavelength of about 430 nm so that it has a purple or blue color. Another group of LEDs used may cast light in the UV range such as light having a wavelength of 368 nm. The LEDs may be arranged so that the light emitted by the LEDs is directed onto an attraction surface (preferably the adhesive surface of a glue board) in a pattern highly attractive to the insects to be trapped. To humans, for example, this surface may have a violet or deep blue center area boarded by green areas between the center area and the edges of the attraction surface.

The electronic circuit may be provided to control groups of LEDs or individual LEDs. The electronic circuit may include a programmable microprocessor unit that controls when and which LEDs are on and off, which LEDs flicker and the duration and pattern of the flickering of the LEDs, the brightness of the LEDs, modulation of the brightness of the LEDs, the pattern of modulation of the LEDs, and the like. The output of the LEDs may also be controlled to account for ambient light conditions. Different programs may be used depending upon the species of insects that are the subject of extermination efforts, and to address ambient light conditions.

Various well-known means may be employed to mount the trap to the bottom of a horizontal structure or to a vertical structure. For example, these means may include a plurality of screws attached to the horizontal structure and projecting downwardly from the bottom surface. Such screws are positioned and adapted to cooperate with key holes in the back of the housing. The keyholes have a first section large enough in diameter to permit the head of a screw to pass through the opening and a slot having a width narrower than the diameter of the head of the screw, but wider than the shaft of the screw. When this attachment mechanism is used, the back of the trap is positioned so the screws are aligned with the first section of the slots. The trap is then pushed up so the heads of the screws pass through the first sections of the slots and the back of the trap is tight against the horizontal surface. The trap can then be slid horizontally so shafts of the screws enter the slots and the heads of the screws engage the back of the trap adjacent to the slots to hold the trap in place.

When the trap is so positioned, ideally one of the integrally formed side panels (or end caps) would be positioned between the light source and people who might view the trap. This will prevent bright direct light from the light source penetrating the eyes of the person. This will also obscure from view the adhesive surface of the glue board and any insects that have become trapped on the glue board. At the same, the trap still emits sufficient light between or around the integrally formed panel and through openings in the integrally formed panel to attract insects to the trap. Employing two such panels to reduce glare and obscure the trapped insects is advantageous when the horizontal surface is adjacent a mirror or other reflective vertical surface or when people can see the trap from opposite sides. Employing two such panels is also advantageous when mounting the trap on a vertical surface unless the trap is mounted immediately adjacent a second vertical surface.

BRIEF DESCRIPTION OF THE DRAWINGS

The features and attributes which may be employed to practice the present invention will be better understood from a review of the detailed description provided below in conjunction with the accompanying drawings.

DETAILED DESCRIPTION

Figure 1:
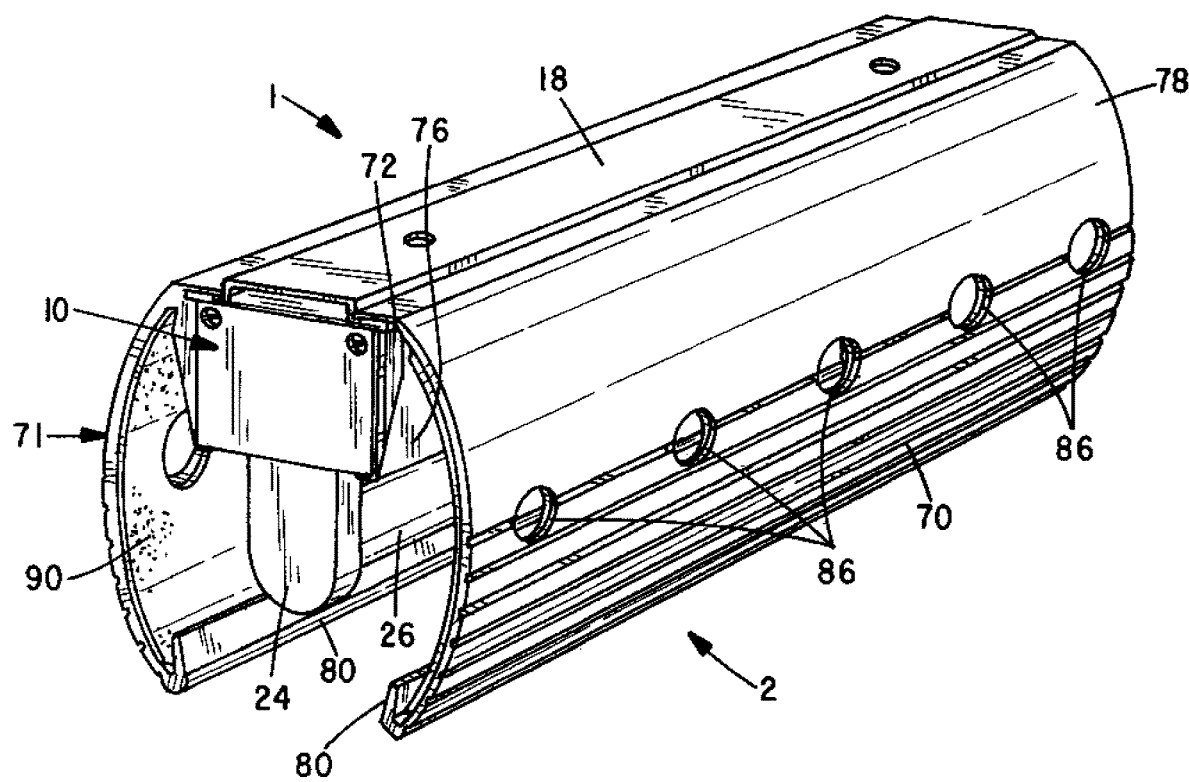
FIG. 1 is a perspective view showing the front of a flying insect trap made in accordance with the present invention.
Figure 2:
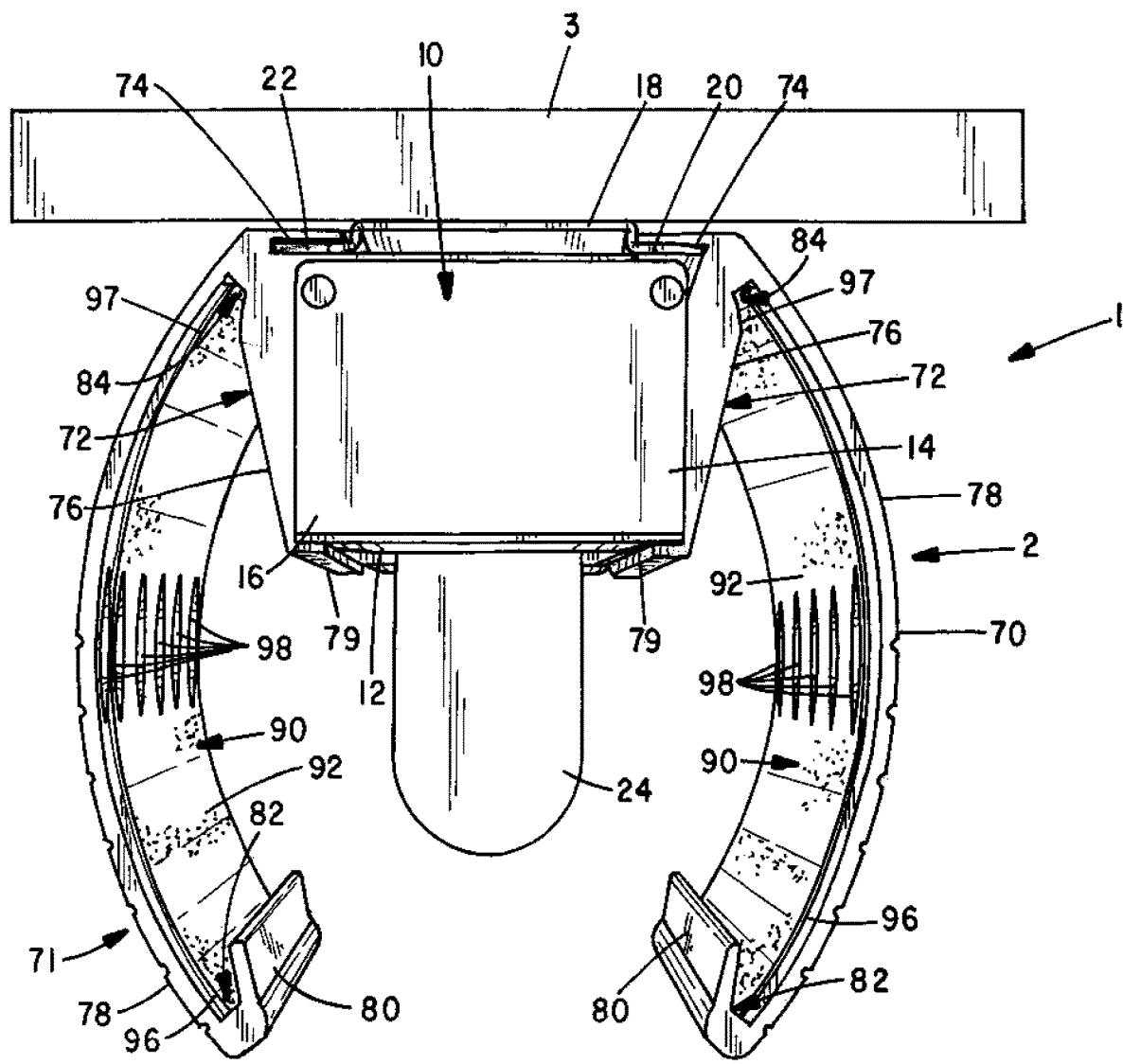
FIG. 2 is an end view showing the trap of FIG. 1.
Figure 3:
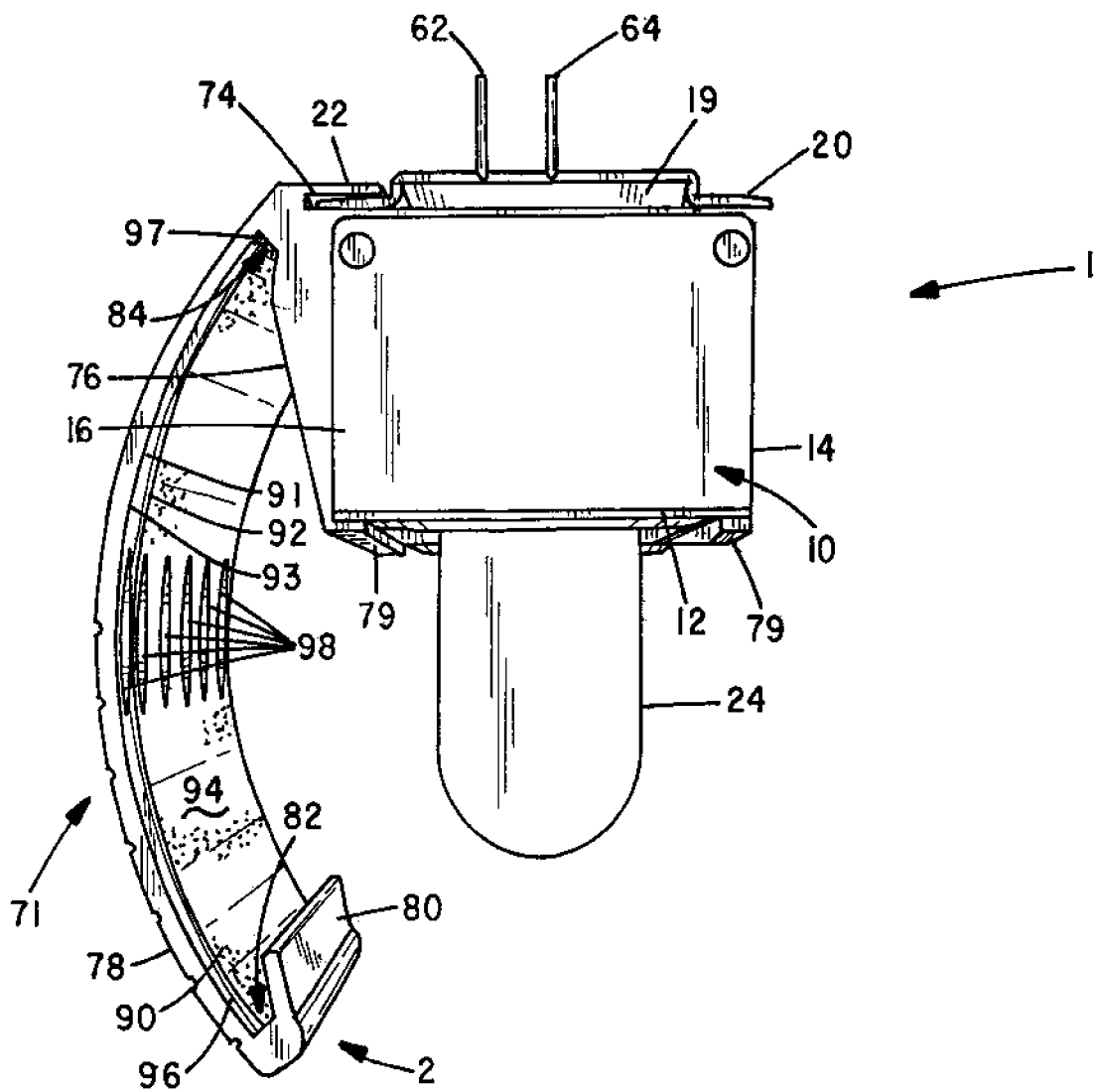
FIG. 3 is an end view of the trap of FIG. 1 with one of the integrally-formed side panels removed and which has been adapted to plug directly into an electrical socket.
Figure 4:
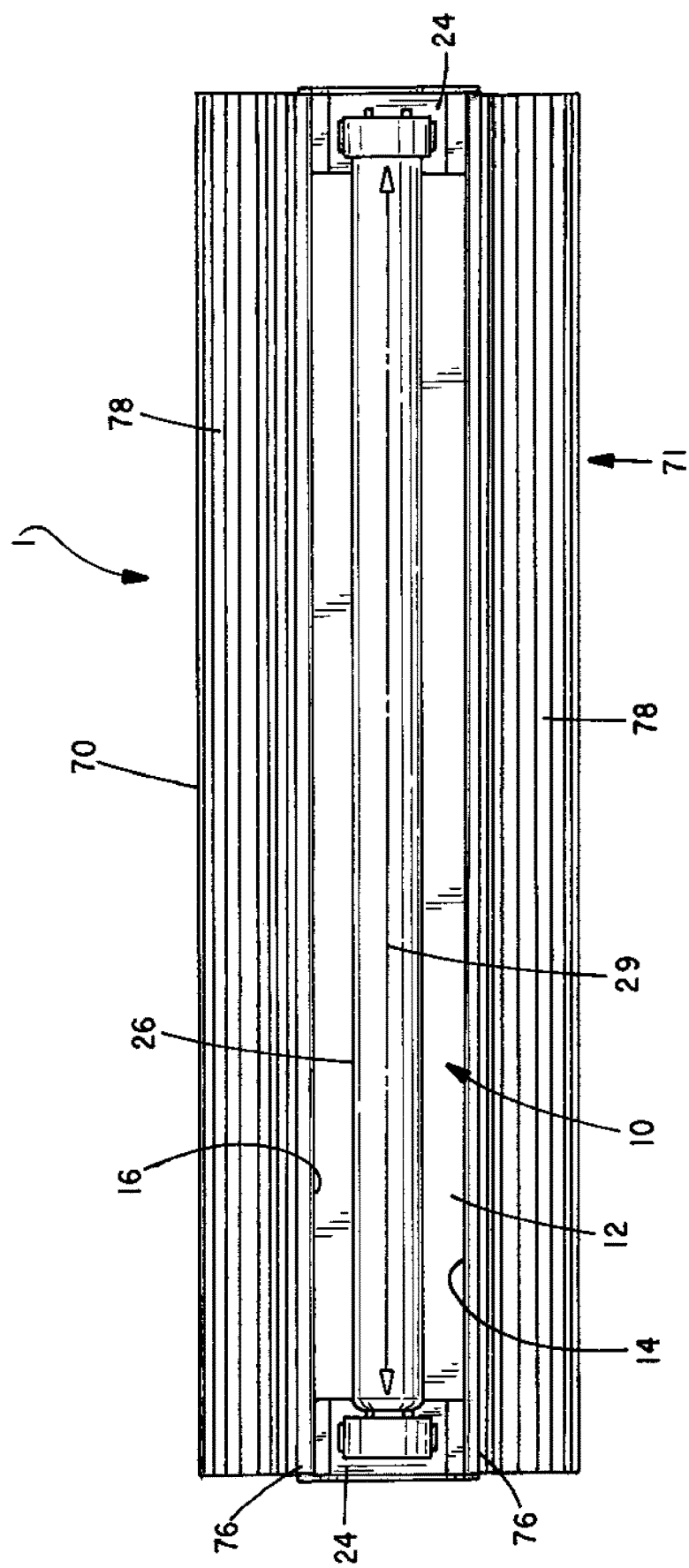
FIG. 4 is a bottom view of the trap of FIG. 1.
Figure 5:
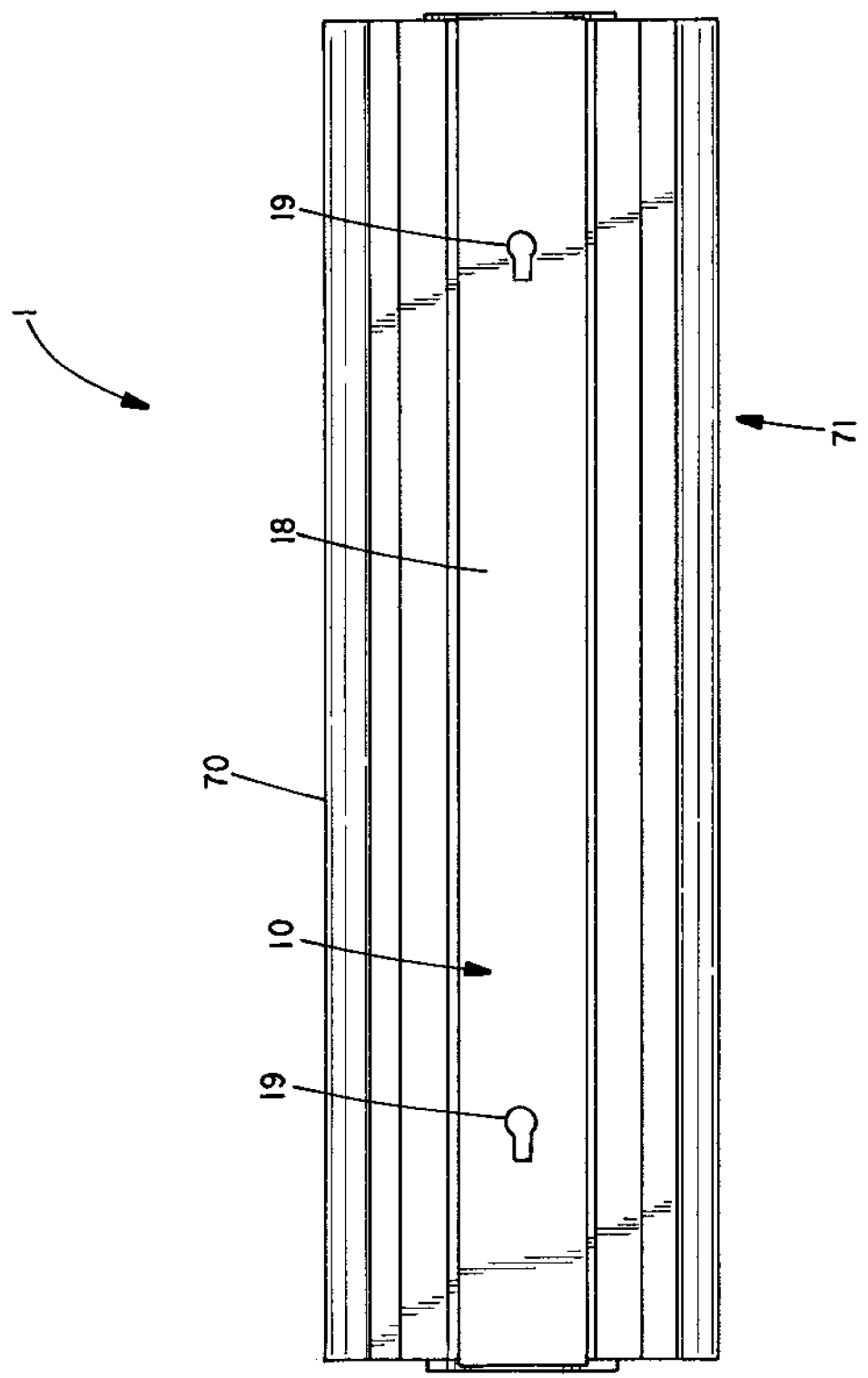
FIG. 5 is a top view of the trap of FIG. 1.
Figure 6:
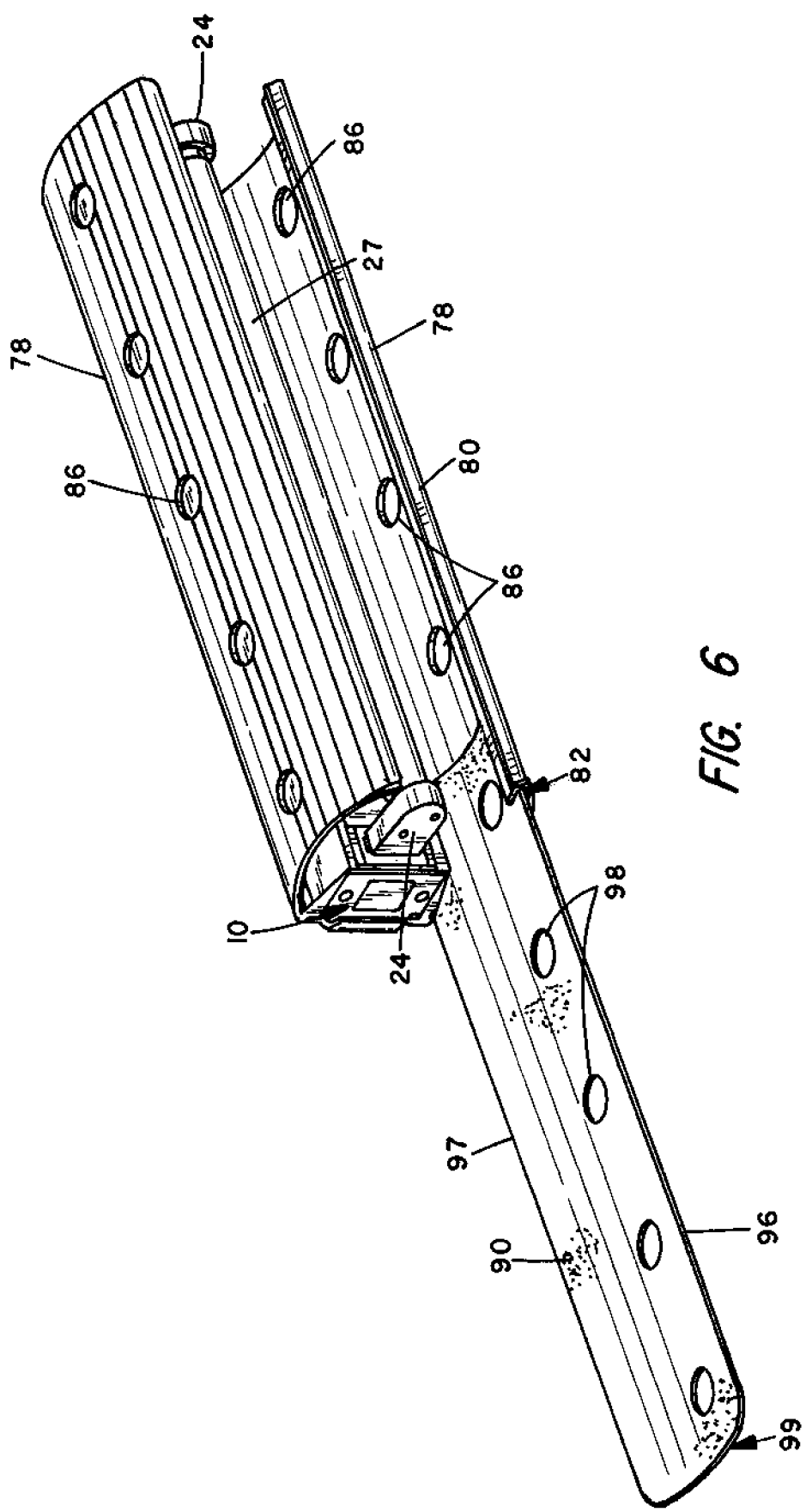
FIGS. 6 and 7 are perspective views of the trap of FIG. 1 demonstrating how a glue board may be inserted (or removed) from one of the integrally formed side panels.
Figure 7:
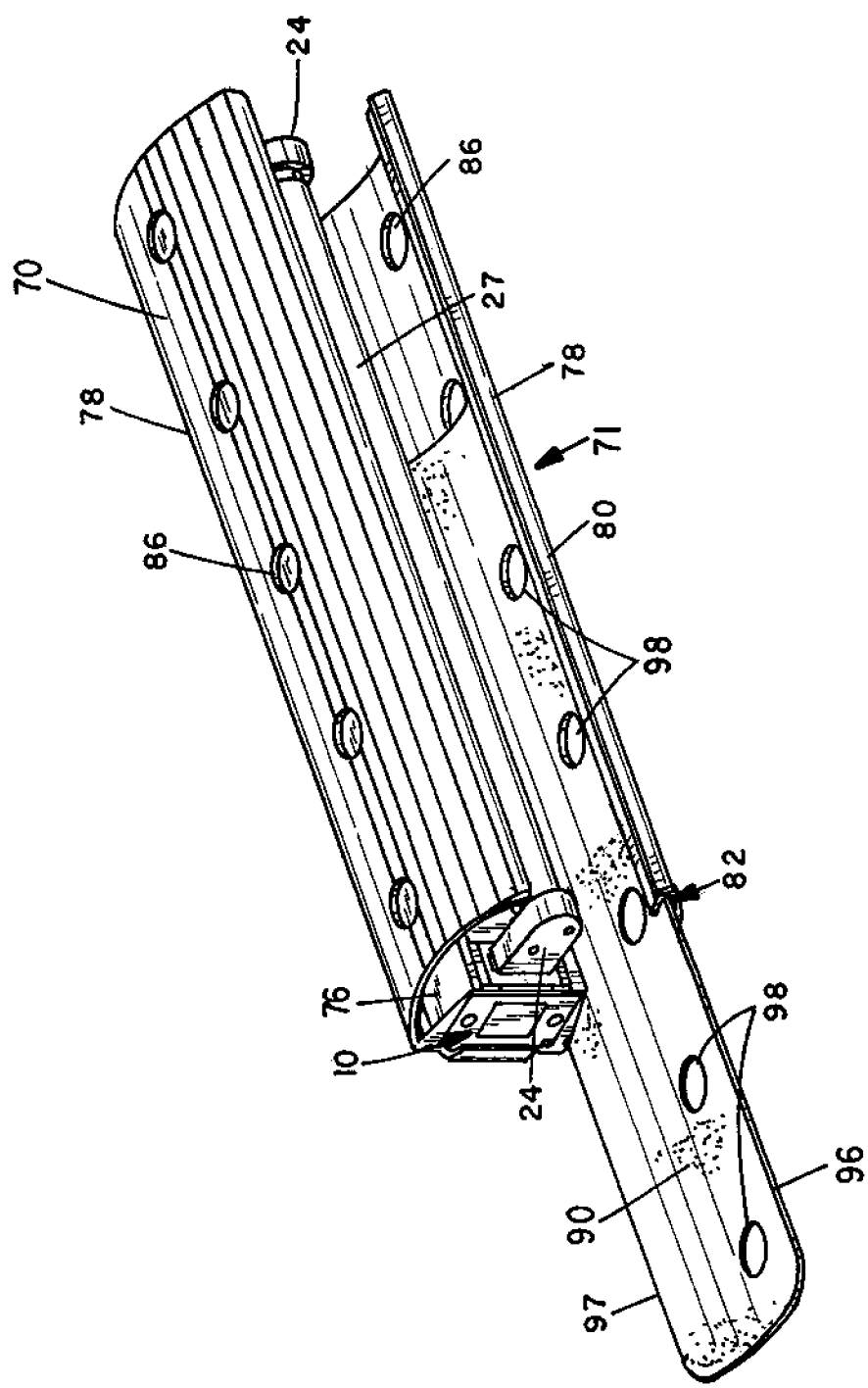

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

The flying insect trap 1 shown in the drawings comprises a housing 10. The housing includes a front 12, first side 14, second side 16 and a back 18. The back 18 may be removable from the rest of the housing 10. The housing also includes a first flange 20 and a second flange 22. First flange 20 projects outwardly from the first side 14 in a direction substantially normal (i.e., at a substantially right angle) to the first side 14. The second flange 22 projects outwardly from the second side 16 in a direction substantially normal (i.e., at a substantially right angle) to the second side 16. The flanges 20 and 22 may be integrally formed with the back 18.

The trap 1 also includes a socket 24 and a light source 26/27. The socket 24 performs three important functions. First, the socket 24 holds the light source 26/27, i.e., the socket 24 couples the light source 26/27 to the housing 10. Second, the socket 24 orients the light source 26/27 so that the light source 26/27 extends along a longitudinal axis 29. Third, the socket 24 supplies electrical energy to the light source 26/27.

Figure 12:
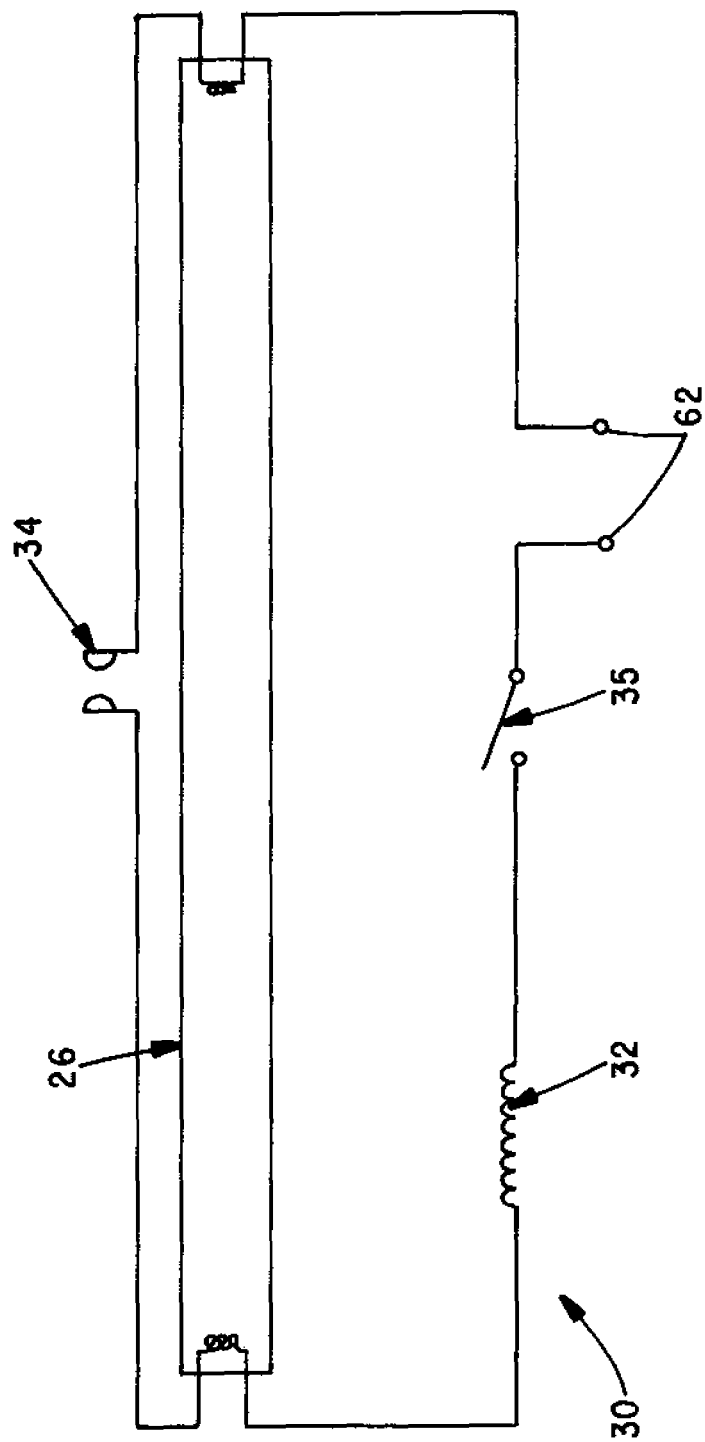
FIG. 12 is a schematic diagram of an alternative circuit that may be employed when a fluorescent tube is employed as an insect-attractant light source.
Figure 13:
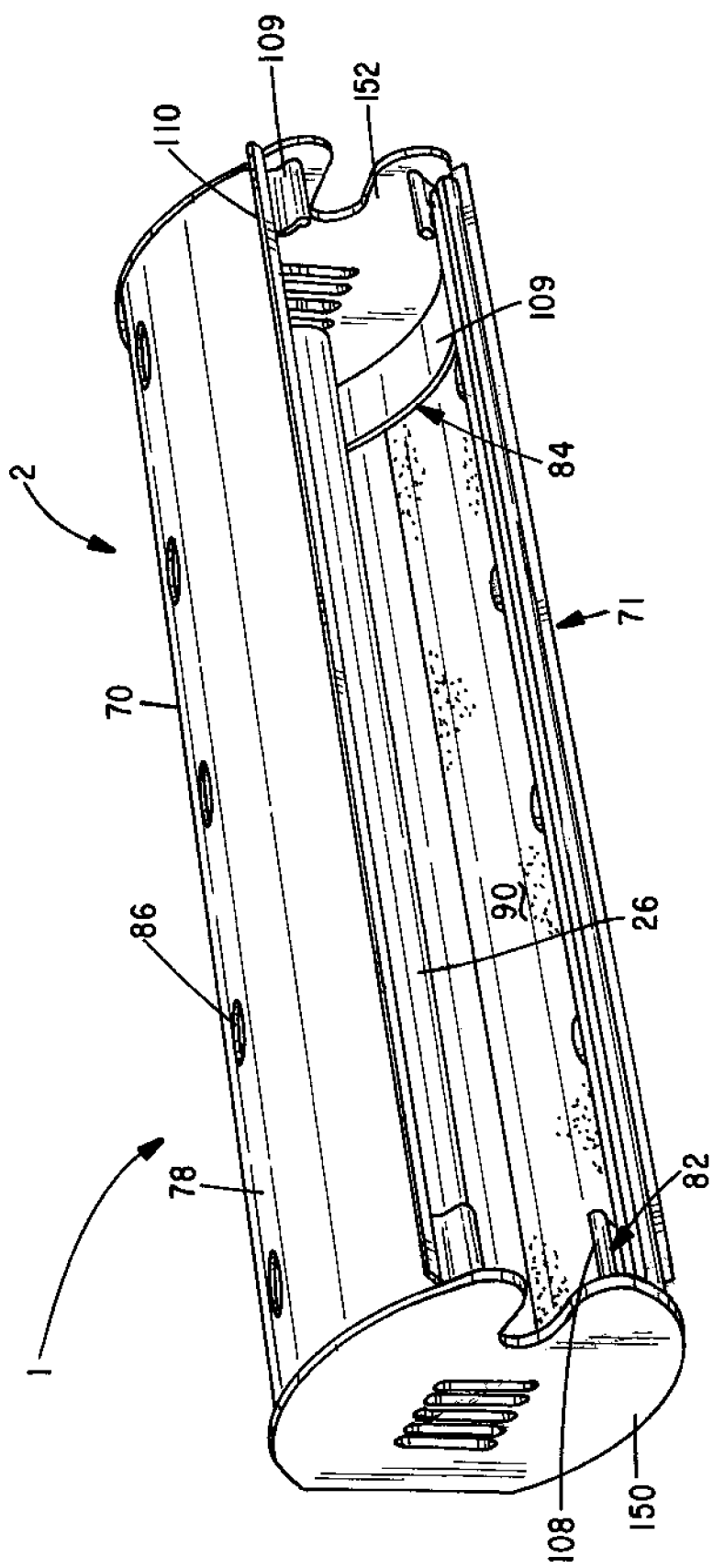
FIG. 13 is a perspective view of an alternative shade for a flying insect trap.
Figure 14:
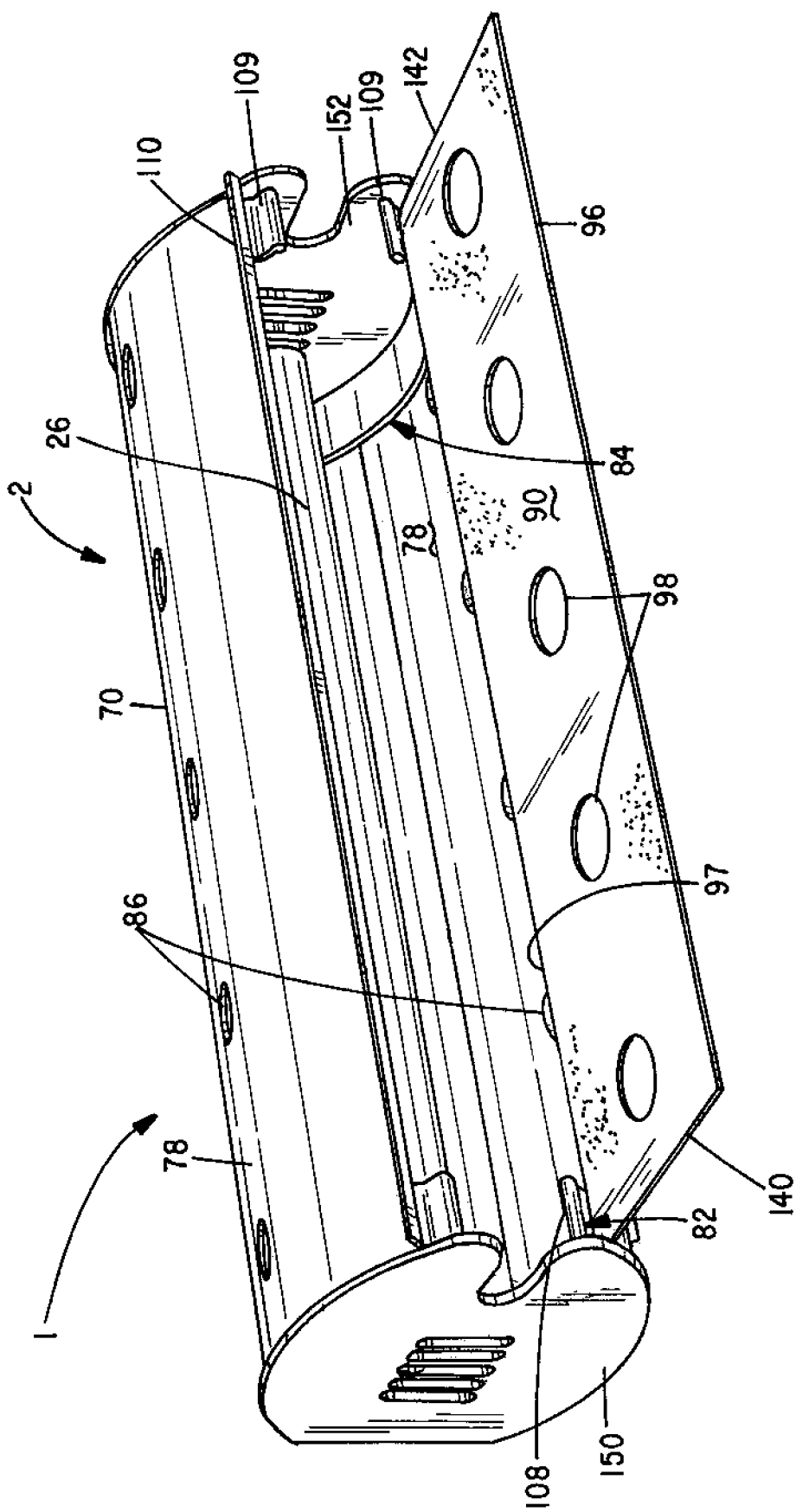
FIG. 14 is another perspective view of the shade of FIG. 13 with a first glue board positioned to be received in the glue board receiving channels adjacent a first side panel of the shade.
Figure 15:
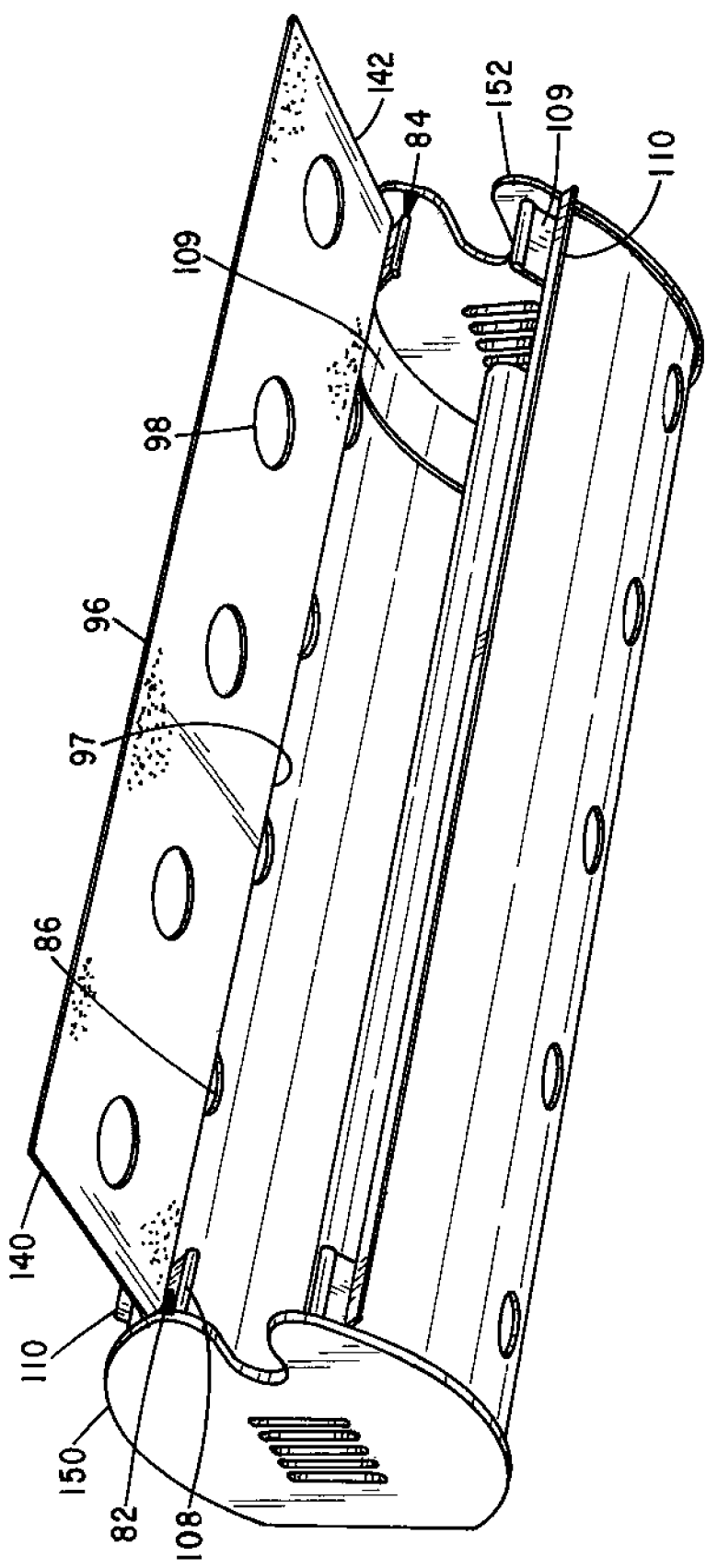
FIG. 15 is another perspective view of the shade of FIG. 13 with a second glue board positioned to be received in the glue board receiving channels adjacent a second side panel of the shade.

The light source 26/27 is adapted to generate light at wavelengths that attract insects. The light source can be a UV fluorescent bulb 26, an LED or series of LEDs 27. The light source 26/27 is powered by electronic circuit 30/31. As shown in FIG. 12, the circuit 30 comprises ballast 32, a starter 34 and an on/off switch 35. Circuit 30 is employed when the light source is fluorescent bulb 26. Circuit 30 (other than bulb 26) is positioned inside the housing.

Figure 10:
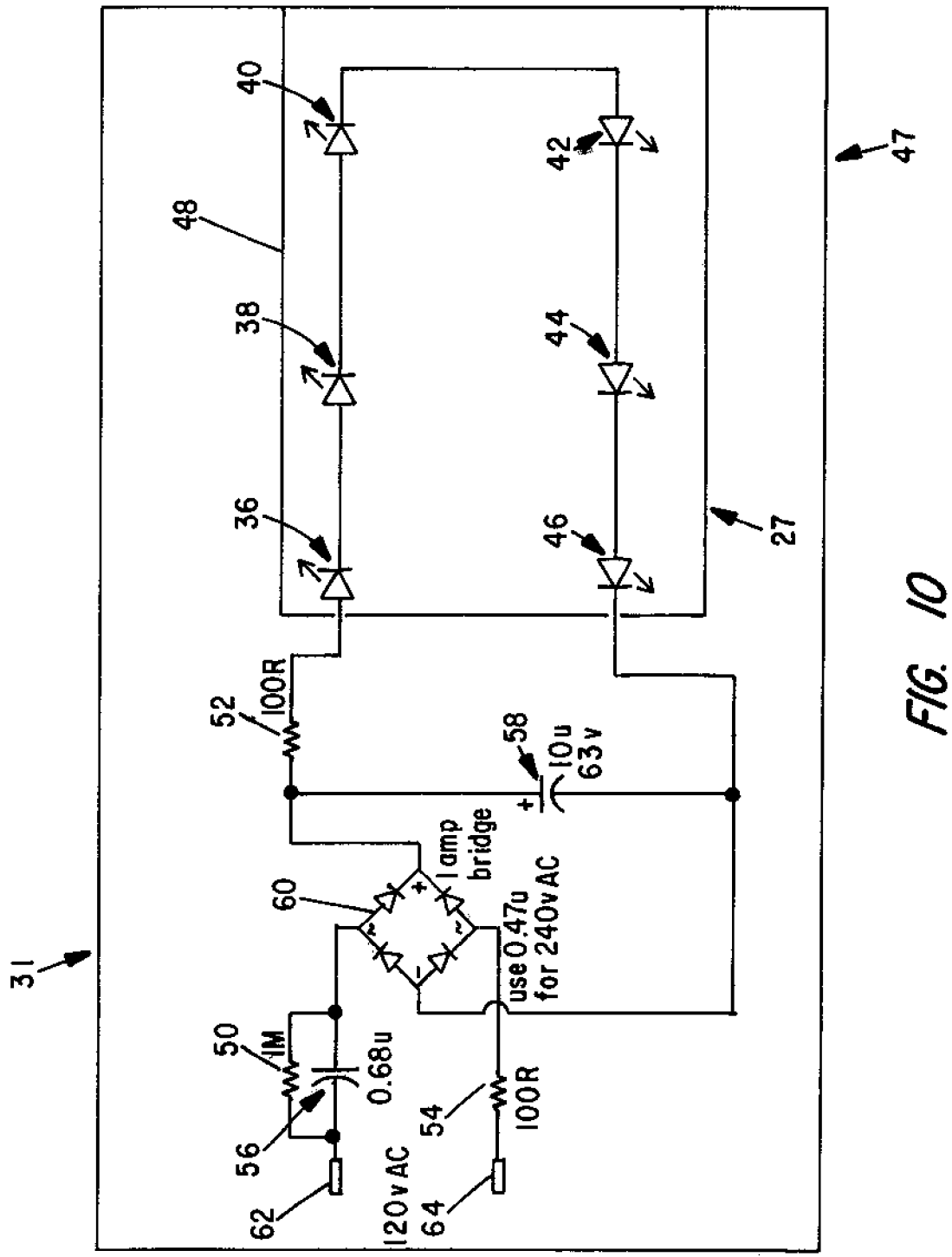
FIG. 10 is a schematic diagram showing different groups of LEDs may be deployed to create a desired light pattern on an attractant surface such as the adhesive surface of a glue board.

In the alternate embodiment shown in FIG. 10, the light source 27 comprises six separate LEDs 36-46 arranged on (or in) an LED mount 47 adapted to be coupled to the socket 24. The LED mount may be a flat substrate made of any suitable (non-conductive) material or may be (or include) a tube 48 made of a UV light transmissive material surrounding the LEDs 36-46. Circuit 31 includes resistors 50, 52 and 54, capacitors 56 and 58 and a full waive rectifier bridge 60. Bridge 60 converts to direct current the 120 v alternating current supplied to the prongs 62 and 64 by the electrical outlet (not shown). The various resistors and capacitors control the delivery of electrical energy to the LEDs 36-46.

The electrical circuit 31 is adapted to fit in the housing 10 and supply electrical energy to the socket 24 in a controlled manner. The LEDs 36-46 are of a type that generate peak output in the UV light range which is most attractive to flying insects. The circuit 31 may also be adapted to selectively dim and brighten the light-emitting diodes 36-46 (or to cycle them on and off) in a controlled sequence to increase insect attraction. The circuit may also be adapted to be powered by a battery supplying DC current in which case the battery (not shown) is located within the housing 10.

As indicated above, electrical power may be supplied to either circuit 30 or circuit 31 by a standard electrical outlet in which prongs 62 and 64 are inserted. The electrical connection may be made using a standard electrical plug incorporating prongs 62 and 64 and a power cable connection circuit 30/31 to the plug. When this method of powering the trap 1 is employed, some means are provided to mount the trap 1 to the underside of horizontal surface 3. Without limitation, these means may include a plurality of screws attached to the bottom horizontal surface 3 of a structure and projecting downwardly from the bottom and key holes 19 in the back of the housing having a first section large enough in diameter to permit the head of a screw to pass through the opening and a slot having a width narrower than the diameter of the head of the screw, but wider than the s haft of the screw. When this attachment mechanism is used, the back of the trap is positioned so the screws are aligned with the first section of the slots. The trap is then pushed up so the heads of the screws pass through the first sections of the slots and the back of the trap is tight against the horizontal surface 3. The trap may then be slid horizontally so shafts of the screws enter the slots and the heads of the screws engage the back of the trap adjacent to the slots to hold the trap in place.

Alternatively, the prongs 62 and 64 may be coupled to the circuit and extend directly from the back 18 of the housing 10. In this embodiment, the prongs provide two functions when plugged into a standard electrical outlet (not shown) supplying household current. First, the prongs supply electrical energy to the electronic circuit 30/31. Second, the prongs support the entire insect trap 1.

In addition to the housing 10, socket 24, light source 26/27 and circuit 30/31, the trap 1 includes a shade 2 comprising at least one integrally formed side panel 70. A second substantially identical integrally formed side panel 71 may also be provided. The integrally formed side panels may be inexpensively made using a plastic material and an extrusion process. As the extrusion exits the extruder and the plastic cools, the extrusion is simply cut to length to finish the manufacture of the integrally formed side panels 70/71.

Each of the integrally formed side panels 70/71 includes a housing clamp 72. The housing clamp 72 is used to couple the integrally formed side panel 70/71 to the housing 10. The housing clamp 72 includes a first channel 74 adapted to receive, pinch against and frictionally engage one of the flanges 20/22. Extending from the first channel 74 is a gusset (inner wall) 76 terminating in a first lip 79 adapted to engage the front 12 of housing 10 to aid the channel 74 and flange 20/22 in securing the integrally formed side panels 70/71 to the housing 10.

Each of the integrally formed side panels 70/71 also has a curved main wall 78 extending from the housing clamp 72 and terminating in a second lip 80. Lip 80 forms a first glue board edge receiving channel 82. A second glue board edge receiving channel 84 is formed at the intersection of the gusset 76 and the curved main wall 78. The primary function of the integrally formed side panels 70/71 is to obscure. More specifically, curved main wall 78 obscures from view the light source 26/27, since direct light from the light source 26/27 can be harsh and annoying to people near the trap 1. The curved main wall 78 also obscures from view the adhesive surface 92 of a glue board 90 (discussed further below) on which insects are captured. Of course, light must escape from the trap 1 to lure insects to the trap 1 and there must be passageways for insects to enter the trap 1 so the insects encounter the glue board 90. Therefore, the curved main walls 78 of the integrally formed side panels may include openings 86.

Figure 8:
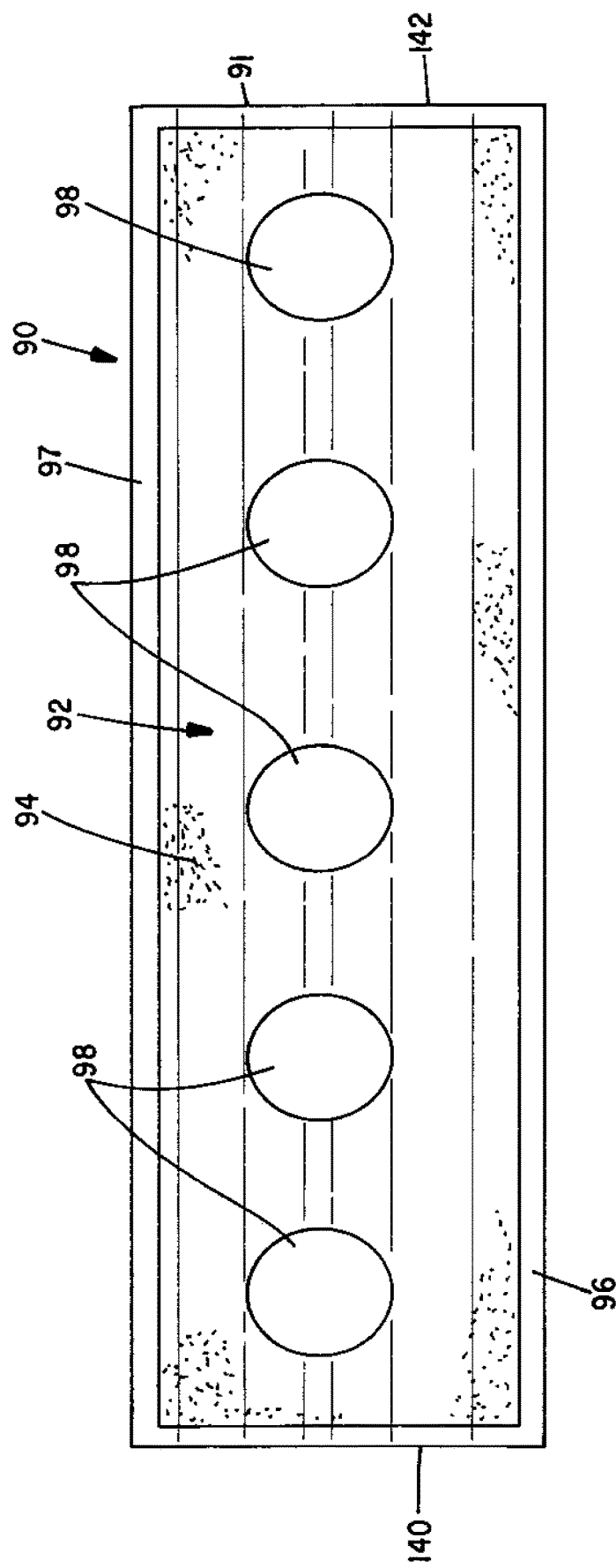
FIG. 8 is a front view of a glue board.
Figure 9:
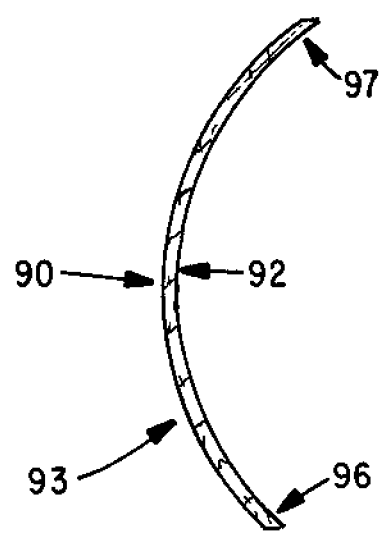
FIG. 9 is an end view of a glue board.

As best shown in FIGS. 8 and 9, glue board 90 comprises a substrate 91 and has a front side 92 and a back side 93. An adhesive layer 94 on the front side 92 coats a selected portion of the substrate 91. As shown in FIG. 8, the edges of the substrate 91 are left uncoated so a user need not touch the adhesive layer 94 when replacing the glue board 90 and so the edges 96 and 97 do not engage the surfaces surrounding the glue board receiving channels 82 and 84. The features of the glue board 90 discussed above are common to many glue boards offered by pest control device manufacturers. However, glue board 90 has distinguishing features. As shown in the drawings, the glue board 90 is adapted to permit UV light to pass through the glue board 90. This is achieved by including a plurality of perforations 98 extending through the glue board 90. The glue board 90 is adapted so that these perforations 98 are aligned with openings 86 of the curved main wall 78. Further, the substrate 91, while relatively stiff, is either curved (or adapted to curve) so that its curvature matches that of the curved main wall 78 when glue board edges 96 and 97 are inserted into the glue board receiving channels 82 and 84.

One of the advantages of the curved main wall 78 and such a glue board 90 is that opposing edges 96 and 97 of the glue board 90 engage the surfaces forming the glue board receiving channels 82 and 84 with sufficient force to prevent the glue board from inadvertently or accidentally sliding out of the side panels 70/71. Also, because the curved inner surface of the curved main wall engages the back side 93 of the glue board 90, friction between these two surfaces further aids in retaining the glue board 90 in place. Further, the adhesive layer 94 covering a portion of the front side 92 of the substrate 91 is concave and is held in a position partially surrounding the longitudinal axis along which the light source is held by the socket.

The combination of elements described above is highly advantageous because the trap 1 presents a light pattern that is highly attractive to flying insects and a secure manner for retaining the glue board in a location that is obscured from the view of people near the trap.

Those skilled in the art of insect trap design have operated under the premise that UV light is an effective insect attractant. While this is generally true, the pattern of openings through the curved main wall(s) and glue board(s) illustrated in the drawings promote insect capture. Further, a display of light of various wavelengths in both the UV and visible ranges provides even greater insect attraction. Such a display can be created using the alternative circuit shown in FIG. 11 which includes a plurality of LEDs that generate light in different wavelengths. Specifically, the first set of LEDs, consisting of LEDs 100, produces soft white light emulating daylight, i.e., light in the range of 4000K to 6000K. Preferably, this light will have a wavelength of 5000K. Such light is visible to humans. The second set of LEDs, consisting of LEDs 102, produces light that is in the yellow or green portion of the visible light spectrum, i.e., light having a wavelength between 500 and 590 nm. Preferably, the light emitted by the second set of LEDs has a wavelength of 560 nm. The third set of LEDs, consisting of LEDs 104, produces light in the violet or blue portion of the visible light spectrum, i.e., light between 380 nm and 495 nm. Most preferably, the wavelength of the light generated by LEDs 104 has a wavelength of 430 nm. The fourth set of LEDs, consisting of LEDs 106, generates light in the UV range, i.e., light having a wavelength at or below 400 nm. Preferably, the wavelength of light generated by LEDs 106 is in the UV range, i.e., between 315 nm and 400 nm. UV light having a wavelength of 368 nm has proven to be highly effective so the LEDs 106 may be selected to give off light of this wavelength.

Figure 11:
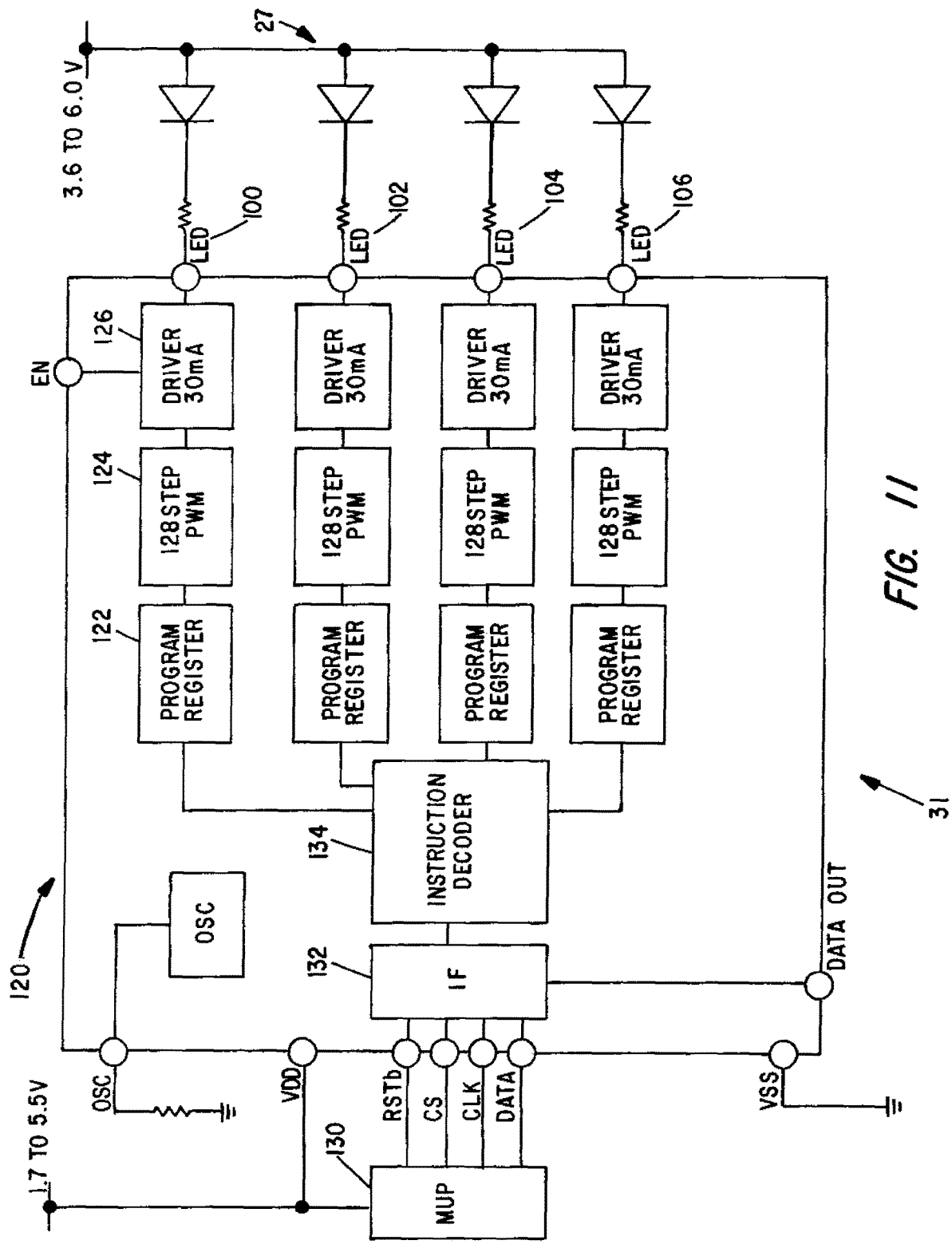
FIG. 11 is a schematic diagram of an alternative electronic circuit for controlling LEDs to insect attractant light in accordance with a selected programmed set of instructions.

Additionally, a control circuit may be provided to permit separate control of each of the LEDs or group of LEDs. A schematic diagram of an exemplary control circuit 120 is illustrated in FIG. 11. As illustrated, the operation of each LED 100-104 is separately coupled to its own program register 122, pulse width modulator 124 and driver 126. This permits the on/off state of each LED to be separately controlled.

More specifically, various operating characteristics of each LED can be separately controlled to increase insect attraction. Examples include:
  Whether the LED is on or off;
  Whether the LED operates at a constant power output or whether the power output is modulated over time;
  If the power output is modulated over time, the pattern, timing, and amounts of changes in the power output;
  Whether the LED is constantly on or flickers on and off; and
  If the LED flickers on and off, the pattern and timing of the flickering.

Further, these and other operating characteristics of each individual LED can be coordinated by the microprocessor unit 130 based on a preprogrammed set of instructions. A user can select between various programs which are individually tailored to address the specific species of insects to be captured and the light characteristics that achieves the best capture rate for such species. Such programs can also be individually tailored to consider ambient light conditions or anticipated changes in ambient light conditions during a day that can also affect insect attraction. The microprocessor unit 130 delivers these instructions via interface 132 to the instruction decoder 134. In turn, the instruction decoder 134 populates the separate program registers 122 associated with each separate LED based on the instructions provided by the microprocessor unit 130. The LEDs 100-106 are thus operated pursuant to the instructions provided by the microprocessor unit 130.

Various advantages arise from the trap described above. First, the light-emitting diodes 36-42 (or 100-106) generate intense UV light without requiring much in the way of electrical power. Second, the glue boards 90 are easily replaced. Third, the openings 86 in the curved main walls 78 and aligned holes 98 in the glue boards 90 are large enough to permit flying insects to see the insect attractive UV light display on the front surface of the glue board. Likewise, the closed sections of curved main walls generally block from human view both glare from the light source and any insects stuck to the adhesive surface of the glue board 90. This is particularly true when the user is at a standing or seated position because of the height at which the traps will typically be mounted beneath a horizontal surface of a shelf, cabinet or bar.

In the embodiments described herein, the insect-attractant light pattern is on the glue board itself. Thus, insects attracted by the pattern are more likely to encounter the adhesive surface of one of the glue boards 90 than if the pattern is some distance from the glue board, as is the case with prior art insect traps employing a glue board.

Still, another significant advantage of the trap 1 is the ability to mount it to the underside of a horizontal surface such as the bottom of a cabinet, bar, shelf or ceiling. Also, the fact that the trap can be employed either with one or both integrally formed side panels provides greater flexibility when selecting a mounting location. Using both integrally formed side panels and the corresponding glue boards will likely increase the rate of capture of insects entering the trap. Further, the presentation of a curved, rather than flat, adhesive surface surrounding a substantial portion of the light source increases the capture of insects entering trap in most environments.

The overall cost of the trap 1 is reduced in several ways. First, the integrally formed side panels are produced from the same plastic extrusion. The extrusion is simply cut to length as it exits the extruder and any such cut piece can be used either as the first or second integrally formed side panel 70/71. Second, a user, such as a pest control company, can decide whether to use a single integrally formed side panel and associated glue board or both panels and glue boards. Installers who work for such companies can be separately supplied with an inventory of housings, integrally formed side panels and glue board and employ them as the installer sees fit taking cost, desired capture rate and aesthetics into account.

Still further, many installations are subject to physical constraints that make it advantageous to provide the installer with the flexibility to employ either one or two integrally formed side panels. Sometimes these physical constraints make it difficult to change a glue board or light source. This is easily achieved even in tight locations with the trap 1. Further, and if necessary, the user can quickly and easily temporarily bend the curved main wall out of the way or even remove the integrally formed side panel(s) to provide access for servicing. No tools or equipment are required to install or remove the light sources 26/27, the glue boards 90 or the integrally formed side panels.

Figure 16:
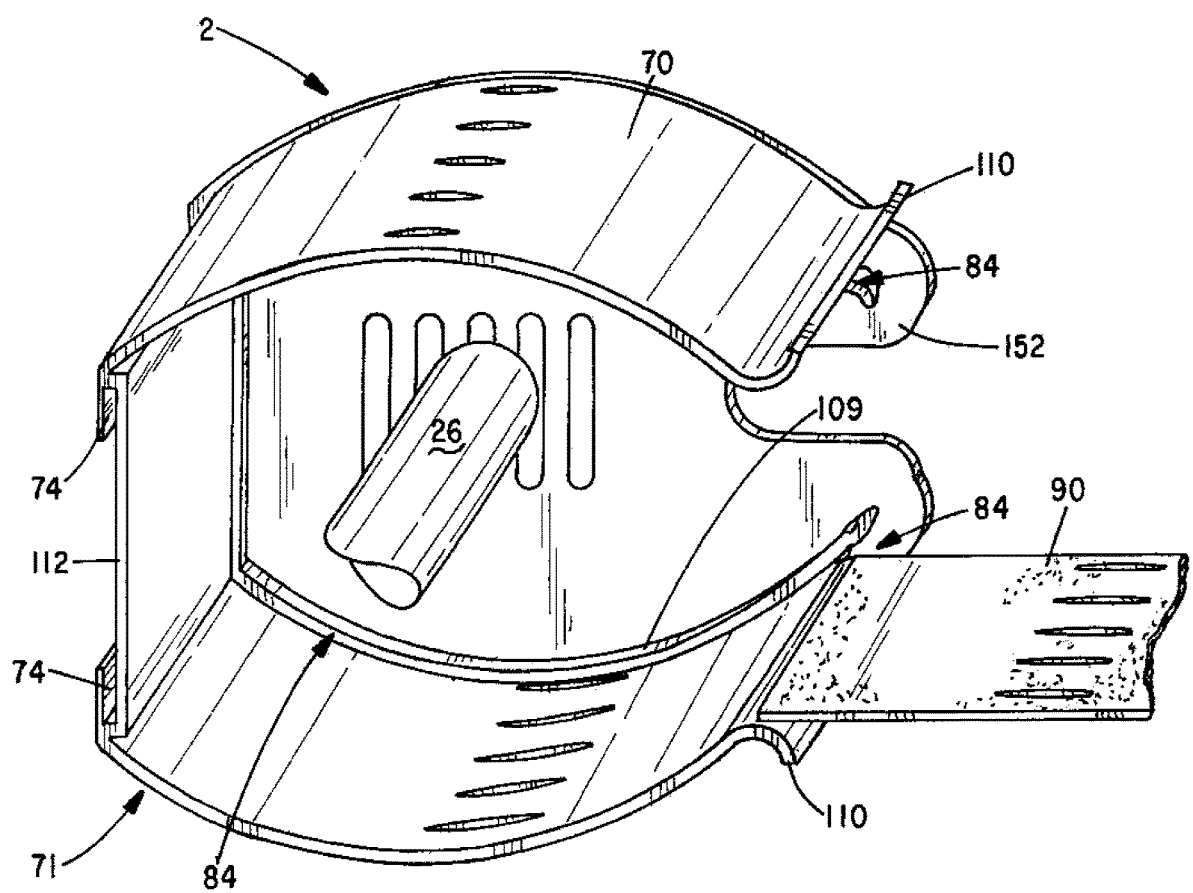
FIG. 16 is an end view of the shade of FIG. 13 with an end cap removed and a first glue board positioned to be inserted.
Figure 17:
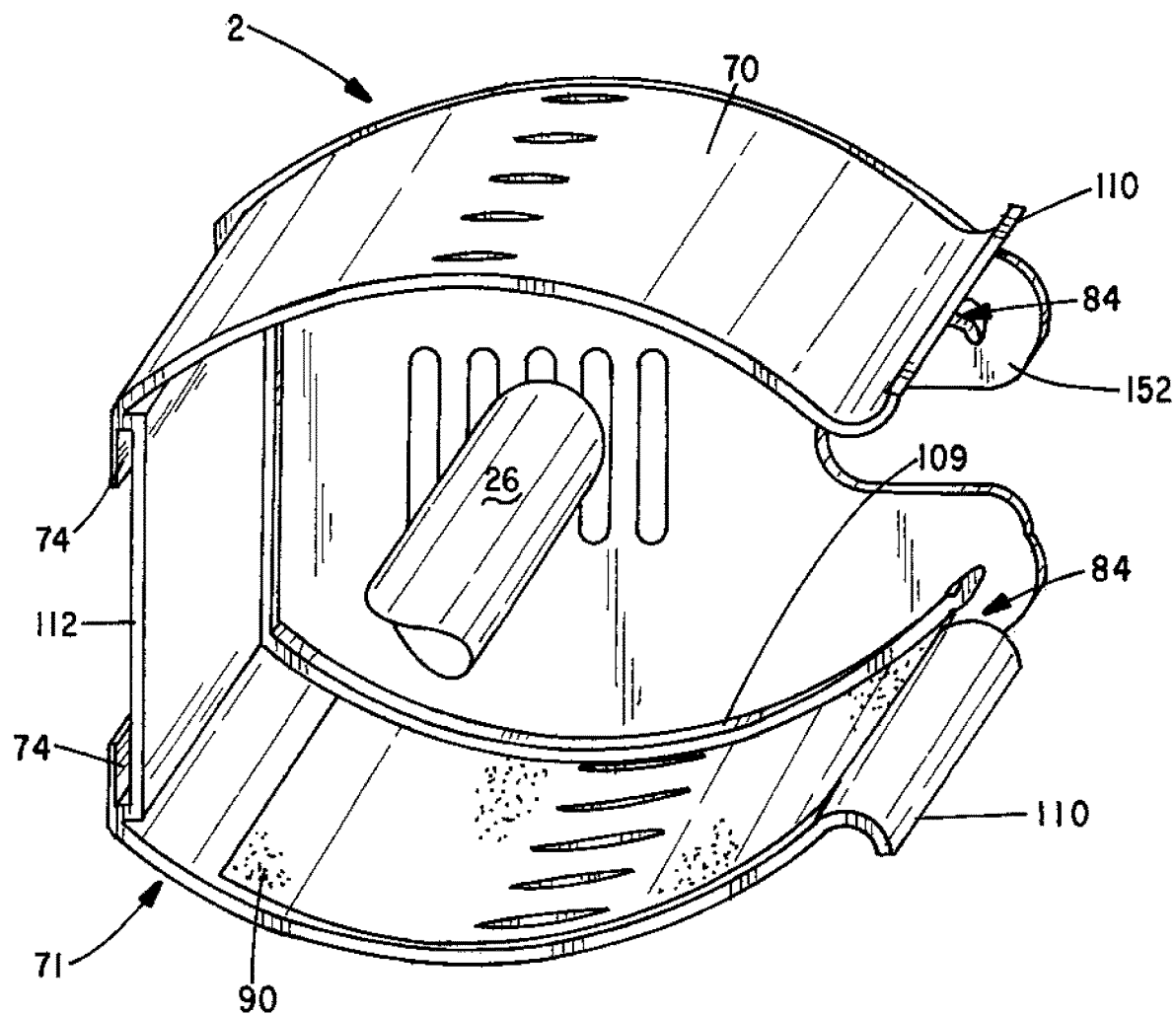
FIG. 17 is a perspective view of the shade of FIG. 13 with an end cap removed and showing a glue board positioned within a glue board receiving channel.

An alternative shade 2 is illustrated in FIGS. 16-17. This shade comprises two side panels 70/71 integrally formed with and joined together by a web 112. Housing clamps including first channels 74 are provided in which opposing edges of the back 18 of housing are captured. The rest of the housing 10 is located on the opposite side of web 112 between the two side panels. The housing 10 is not shown in FIGS. 13-17 so that it does not obscure the details of the design of the shade 2. The housing may have the same configuration shown in FIGS. 1-7. As such, the web 112 is sandwiched between the back 18 and the rest of the housing 10.

In addition to the side panels 70/71 and the web 112, the shade shown in FIGS. 13-17 includes a pair of end caps 150 and 152. The end caps 150 and 152 are adapted to securely mate with the ends of the side panels to close the ends. The end caps 150/152 also each includes a horseshoe-shaped ledge 108/109 (or a pair of ledges) spaced from the side panels 70/71 thereby forming glue board edge receiving channels 82/84 between the ledges 108/109 and the side panels 70/71. The channels 82/84 are adapted to receive the transverse edges 140/142 of the glue board 90 rather than the longitudinal edges 96/97. The channels are curved such that when the glue board 90 is inserted, the glue board 90 curves to match the curvature of the adjacent side panels 70 or 71. This provides a concave adhesive surface or layer 94 partially surrounding the longitudinal axis along which the light source 26/27 extends for capturing insects that enter the trap if a single glue board is used and two such concave adhesive surfaces or layers when two glue boards are used to further improve insect capture. Also, forces between the edges of the glue board and the channels, as well as frictional forces between the non-adhesive side of the glue board and the adjacent side panel, serve to hold the glue board 90 in place. To assist in guiding the glue board as it is inserted into the channel, a curved lip 110 is provided at the free end of each side panel 70/71. These lips also stiffen the side panels.

Insects are lured to the trap 1 incorporating the shade 2 of FIGS. 13-17 by light emitted from the light source 26/27. Insect attractant light can exit the trap through the space between the two side panels or through the openings 86 in the curved main wall of each side panel 70/71. As discussed above, the glue board has perforations 98 adapted to be aligned with openings 86 so that the glue board does not block the light from exiting, or insects from entering, through these openings.

The design of the shade 2 shown in FIGS. 13-17 is in many respects less complicated than the shade shown in FIGS. 1-7. As such, the shade should be easier to fabricate and at less expense using an extrusion process. However, the shade of FIGS. 13-17 does require use of the end caps 104 and 106. End caps may be used, but are not required, by the design shown in FIGS. 1-7.

The foregoing description is intended to explain the various features and advantages, but is not intended to be limiting. The scope of the invention is defined by the following claims which are also intended to cover a reasonable range of equivalents.

What is claimed is:

1. An insect trap comprising:
    (a) an electronics housing having a first flange and a front;
    (b) at least one socket adapted to support, orient and electrify a light source, the at least one socket is attached to the electronics housing;
    (c) a light source having a longitudinal axis, adapted to emit light at a wavelength attractive to insects, and extending from the at least one socket along the longitudinal axis;
    (d) a shade comprising a first integrally formed side panel having a curved main wall, and first and second glue board receiving channels, and a housing clamp, wherein the housing clamp of the first integrally formed side panel has a first channel adapted to receive and frictionally engage the first flange, a first lip adapted to engage the front of the housing, a gusset extending between the first channel and the first lip, the curved main wall extending from the housing clamp and terminating in a second lip wherein said curved main wall and said gusset form the first glue board receiving channel and said curved main wall and said second lip form the second glue board receiving channel; and (e) a glue board having an adhesive layer, a first glue board edge adapted to be received within the first glue board receiving channel and a second glue board edge adapted to be received within the second glue board receiving channel, said glue board adapted to curve such that the curvature of the glue board conforms to the curvature of the curved main wall when its first glue board edge is received in the first glue board receiving channel and its second glue board edge is received in the second glue board receiving channel such that the adhesive layer is concave and surrounds a portion of the longitudinal axis and the first and second glue board edges and the first and second glue board receiving channels, together with frictional engagement between the glue board and the curved main wall, secure the glue board to the first integrally formed side panel.

2. The insect trap of claim 1 wherein the curved main wall and the glue board have openings adapted to be aligned so that the light at a wavelength attractive to insects and insects can pass through said openings.

3. The insect trap of claim 1 wherein the light source comprises at least one LED.

4. The insect trap of claim 1 wherein said light source comprises a plurality of LEDs.

5. The insect trap of claim 1 wherein said light source comprises a plurality of LEDs and a controller adapted to control a light output of the LEDs.

6. The insect trap of claim 1, wherein the electronics housing further comprises a second flange and the shade further comprises a second integrally formed side panel substantially identical to the first integrally formed side panel.

7. The insect trap of claim 6, wherein the second integrally formed side panel comprises a second housing clamp comprising a second channel adapted to receive and frictionally engage the second flange, a third lip adapted to engage the front of the housing and a second gusset extending between the second channel and the third lip, a second curved main wall extending from the second housing clamp and terminating in a fourth lip, wherein said second curved main wall and said second gusset form a third glue board receiving channel and said second curved main wall and said fourth lip form a fourth glue board receiving channel.

8. The insect trap of claim 7 further comprising a second glue board having a third glue board edge adapted to be received within the third glue board receiving channel and a fourth glue board edge adapted to be received within the fourth glue board receiving channel, said second glue board adapted to curve such that its curvature corresponds to the curvature of the second curved main wall when its third glue board receiving edge is received within the third glue board receiving channel and its fourth glue board edge is received within the fourth glue board receiving channel such that forces between the second glue board and second integrally formed side panel are sufficient to securely hold the second glue board and second integrally formed side panel together.

9. The insect trap of claim 8 wherein said second glue board and said second curved main wall each have openings adapted to be aligned with each other.

10. The insect trap of claim 1 the shade further comprises a second integrally formed side panel having a curved main wall and joined by a web to the first integrally formed side panel having the curved main wall.

11. The insect trap of claim 1 wherein the curved main wall has openings formed therethrough which the light at a wavelength attractive to insects and insects may pass and the glue board has openings adapted to be aligned with the openings formed in the curved main wall.

12. The insect trap of claim 1 wherein said light source is an assembly comprising a plurality of LEDs arranged in at least one row.

13. The insect trap of claim 12 further comprising a controller for controlling a light output of each of the LEDs.

* * * * *